(12) United States Patent
Sah et al.

(10) Patent No.: US 7,556,120 B2
(45) Date of Patent: Jul. 7, 2009

(54) METHOD AND APPARATUS TO CONTROL HYDRAULIC PRESSURE IN AN ELECTRO-MECHANICAL TRANSMISSION

(75) Inventors: Jy-Jen F. Sah, West Bloomfield, MI (US); Bryan R. Snyder, Waterford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 167 days.

(21) Appl. No.: 11/440,499

(22) Filed: May 25, 2006

(65) Prior Publication Data

US 2007/0284176 A1 Dec. 13, 2007

(51) Int. Cl.
*B60K 17/356* (2006.01)
(52) U.S. Cl. ........................ 180/305; 60/327
(58) Field of Classification Search ......... 180/305, 180/307, 308, 65.2; 60/327, 329
See application file for complete search history.

(56) References Cited

U.S. PATENT DOCUMENTS

| | | | | | |
|---|---|---|---|---|---|
| 5,513,732 | A | * | 5/1996 | Goates | 192/3.3 |
| 5,823,072 | A | * | 10/1998 | Legner | 74/733.1 |
| 6,338,695 | B1 | * | 1/2002 | Aoki et al. | 477/160 |
| 6,371,885 | B1 | * | 4/2002 | Kobayashi et al. | 477/115 |
| 6,514,175 | B2 | * | 2/2003 | Taniguchi et al. | 477/156 |
| 6,641,498 | B2 | * | 11/2003 | Okuwaki | 475/117 |
| 6,692,402 | B2 | * | 2/2004 | Nakamori et al. | 477/3 |
| 6,773,372 | B2 | * | 8/2004 | Matsubara et al. | 477/78 |
| 6,799,109 | B2 | * | 9/2004 | Nakamori et al. | 701/54 |
| 6,849,030 | B2 | * | 2/2005 | Yamamoto et al. | 477/159 |
| 6,881,165 | B2 | * | 4/2005 | Endo et al. | 474/28 |
| 6,913,558 | B2 | * | 7/2005 | Mori et al. | 477/3 |
| 6,951,526 | B2 | * | 10/2005 | Kuhstrebe et al. | 477/97 |
| 7,018,315 | B2 | * | 3/2006 | Endo et al. | 475/88 |
| 7,041,018 | B2 | * | 5/2006 | Ochiai et al. | 474/28 |
| 7,086,226 | B2 | * | 8/2006 | Oguri | 60/414 |
| 7,150,333 | B2 | * | 12/2006 | Noda et al. | 180/65.2 |
| 7,192,383 | B2 | * | 3/2007 | Shimada et al. | 477/45 |
| 7,273,120 | B2 | * | 9/2007 | Tabata | 180/65.2 |
| 7,285,066 | B2 | * | 10/2007 | Long et al. | 475/121 |
| 7,288,039 | B2 | * | 10/2007 | Foster et al. | 475/5 |
| 7,320,217 | B2 | * | 1/2008 | Yasuda et al. | 60/468 |
| 7,335,133 | B2 | * | 2/2008 | Katou et al. | 477/167 |
| 2007/0062186 | A1 | * | 3/2007 | Wuthrich et al. | 60/488 |
| 2008/0064562 | A1 | * | 3/2008 | Aettel et al. | 477/34 |
| 2008/0104953 | A1 | * | 5/2008 | Vigholm | 60/413 |

* cited by examiner

*Primary Examiner*—Jeffrey J Restifo

(57) ABSTRACT

The invention comprises a method, an article, and a control system for controlling a powertrain having a main and an auxiliary hydraulic pump, with each pump operative to supply hydraulic fluid to a hydraulic circuit of the transmission. It includes determining a main pressure and a desired main pressure, and controlling the auxiliary hydraulic pump. Determining a main pressure in the hydraulic circuit comprises estimating hydraulic pressure. The auxiliary pump is controlled to an operating speed. Control of flow from the auxiliary and main pumps can comprise an exclusive 'either-or' flow, or a blended flow.

15 Claims, 4 Drawing Sheets

METHOD AND APPARATUS TO CONTROL
HYDRAULIC PRESSURE IN AN
ELECTRO-MECHANICAL TRANSMISSION

TECHNICAL FIELD

This invention pertains generally to an electro-mechanical transmission device, and more specifically to a control system for a hydraulic system of the transmission device.

BACKGROUND OF THE INVENTION

An electromechanical transmission device can be used as an element in a hybrid powertrain system to control torque and speed output to a driveline transmitted from torque-generative devices. The torque-generative devices typically comprise an internal combustion engine and electric machines. One hybrid powertrain architecture includes a two-mode, compound-split, electro-mechanical transmission operative to receive torque input from the torque-generative devices. Management of the torque inputs to achieve an output includes selective actuation of torque-transfer devices, or clutches, contained in the transmission. Actuation of each clutch is effected via selectively applied hydraulic pressure from a hydraulic circuit. Pressurized fluid through the hydraulic circuit is typically supplied from a hydraulic pump that is driven off of an input shaft from the internal combustion engine.

A vehicle using a hybrid powertrain reduces fuel consumption and improves fuel economy by selectively shutting off the internal combustion engine under specific operating conditions, e.g. when the vehicle is stopped at a stoplight, or coasting. Under such conditions, the engine-driven hydraulic pump is inoperative and unable to maintain fluidic pressure in the hydraulic circuit. A currently applied torque-transfer clutch may deactivate due to leak down of hydraulic pressure. Engineers have addressed the issue of leak down of hydraulic pressure during engine shutoff events by mechanizing an electrically-driven auxiliary hydraulic pump operable to supply hydraulic pressure to the torque-transfer clutches.

There is a need for a control system to operate an electrically-driven auxiliary hydraulic pump, to manage electrical energy consumption by the pump and to control hydraulic fluid pressure to the torque transfer clutches for vehicle operation.

SUMMARY OF THE INVENTION

Therefore, in accordance with an embodiment of the invention, there is provided a method and article of manufacture for controlling a powertrain system comprising an engine operatively connected to a transmission having a main hydraulic pump and an auxiliary hydraulic pump with each pump operative to supply hydraulic fluid to a hydraulic circuit of the transmission. The method includes determining a main pressure and a desired main pressure in the hydraulic circuit, and controlling operation of the auxiliary hydraulic pump based upon the main pressure, the desired main pressure, and an input to the main pump. Determining a main pressure in the hydraulic circuit preferably comprises estimating hydraulic pressure in the hydraulic circuit of the transmission based upon a speed of the engine and a speed of the auxiliary hydraulic pump.

An aspect of the invention includes determining a desired main pressure in the hydraulic circuit, which comprises determining status of operation of the engine, monitoring a temperature of the hydraulic fluid, determining a desired pressure for a torque-transfer clutch of the transmission; and, generating a parametric value for the desired main pressure based thereon.

Another aspect of the invention includes a control system for a powertrain comprising an engine operatively connected to a transmission having a main hydraulic pump and an auxiliary hydraulic pump each pump operative to selectively supply pressurized fluid to a hydraulic circuit for the transmission. The control system comprises a distributed control module system operative to execute a control scheme operable to determine a pressure in the hydraulic circuit, determine a desired pressure in the hydraulic circuit, and, control operation of the auxiliary hydraulic pump based upon the hydraulic pressure, the desired hydraulic pressure, and a control input to the main pump. The transmission comprises a two-mode compound split electro-mechanical transmission having four torque transfer clutches. The control system is operative to selectively actuate the four torque transfer clutches to selectively operate the transmission in one of four fixed gears and two electrically variable modes. Operative power to the main hydraulic pump originates from an input shaft from the engine. The auxiliary pump comprises an electrically-driven pump operative to receive power controlled by the distributed control module system.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
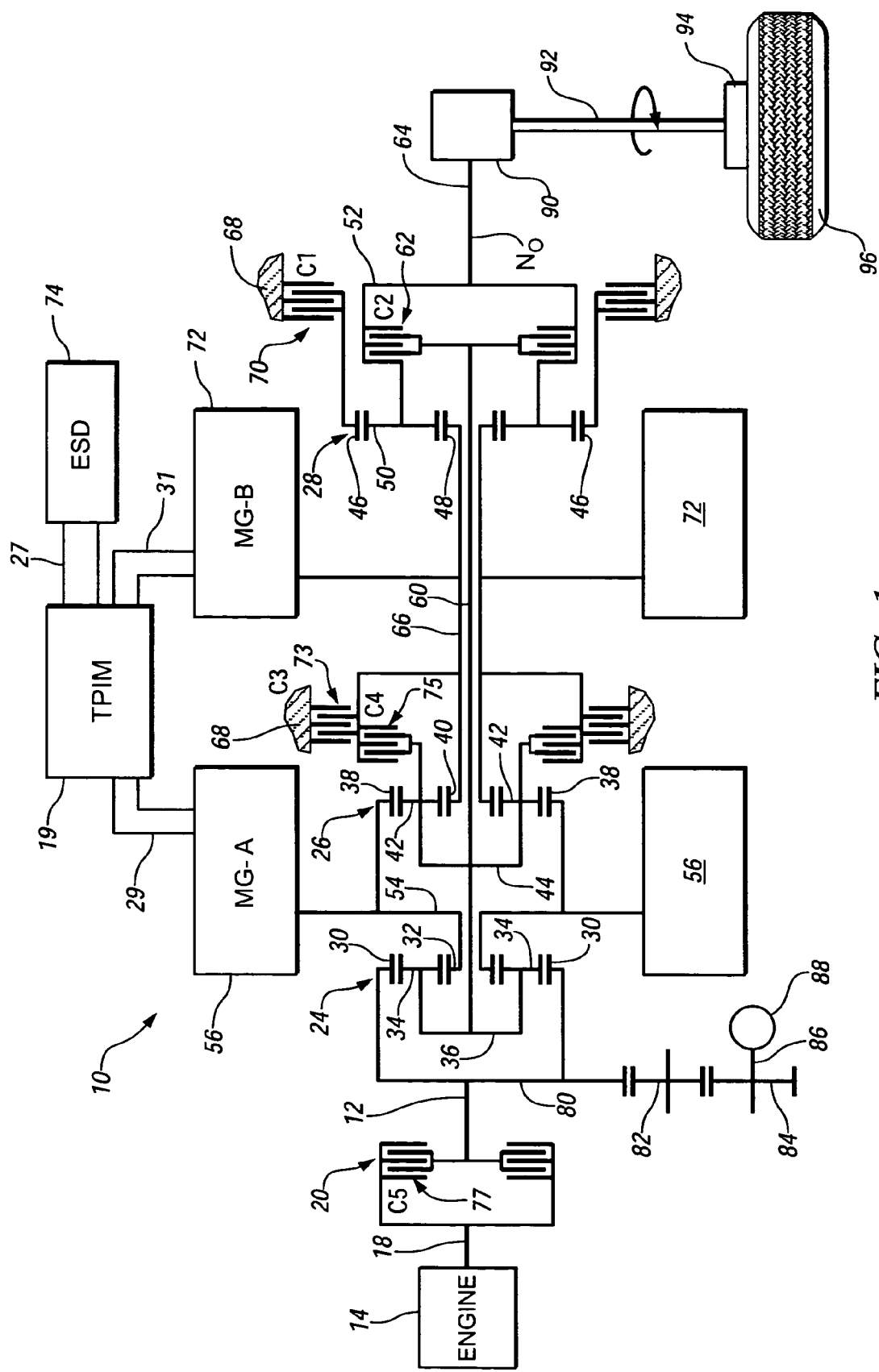
FIG. 1 is a schematic diagram of an exemplary powertrain, in accordance with the present invention.
Figure 2:
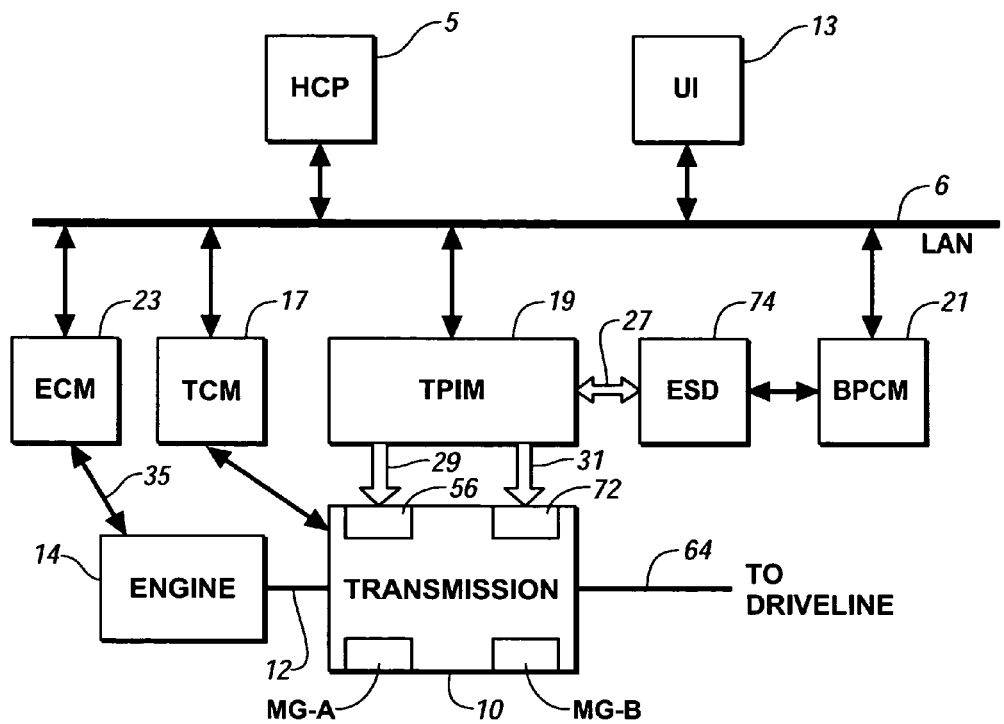
FIG. 2 is a schematic diagram of an exemplary control architecture and powertrain, in accordance with the present invention.

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953, 409, entitled "Two-Mode, Compound-Split, Hybrid Electro-Mechanical Transmission having Four Fixed Ratios", which is incorporated herein by reference. The exemplary two-mode, compound-split, electromechanical transmission embodying the concepts of the present invention is depicted in FIG. 1. The transmission 10 has an input shaft 12 preferably directly driven by engine 14. A transient torque damper 20 is incorporated between the output shaft 18 of the engine 14 and the input member 12 of the transmission 10. The transient torque damper 20 preferably comprises a torque transfer device 77 having characteristics of a damping mechanism and a spring. The transient torque damper 20 permits selective engagement of the engine 14 with the transmission 10. The torque transfer device 77 is not utilized to change, or control, the mode in which the transmission 10 operates. The torque transfer device 77 preferably comprises a hydraulically operated friction clutch, referred to as clutch C5.

The engine 14 can be any of numerous forms of internal combustion engines, such as a spark-ignition engine or a compression-ignition engine, readily adaptable to provide a torque output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the transmission 10 utilizes three planetary-gear sets 24, 26 and 28. The first planetary gear set 24 has an outer ring gear member 30 which circumscribes an inner, or sun gear member 32. A plurality of planetary gear members 34 are rotatably mounted on a carrier 36 such that each planetary gear member 34 meshingly engages both the outer gear member 30 and the inner gear member 32. Planetary gear set 24 meshingly engages accessory gear 82, which meshingly engages gear 84 which drives shaft 86 which is operatively connected to hydraulic pump 88. Hydraulic pump 88 is a known device preferably sized to supply hydraulic fluid to a hydraulic circuit of the transmission at pressure/flow rates sufficient to meet system requirements, including pressure levels for clutch actuation, and flow rates sufficient to meet needs for system cooling and lubrication. Further details of an exemplary hydraulic circuit are shown with reference to FIG. 3, described hereinbelow.

The second planetary gear set 26 has an outer ring gear member 38, which circumscribes an inner sun gear member 40. A plurality of planetary gear members 42 are rotatably mounted on a carrier 44 such that each planetary gear 42 meshingly engages both the outer gear member 38 and the inner gear member 40.

The third planetary gear set 28 has an outer ring gear member 46, which circumscribes an inner sun gear member 48. A plurality of planetary gear members 50 are rotatably mounted on a carrier 52 such that each planetary gear 50 meshingly engages both the outer gear member 46 and the inner gear member 48.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined through a hub plate gear 54 to the outer gear member 38 of the second planetary gear set 26. The conjoined inner gear member 32 of the first planetary gear set 24 and the outer gear member 38 of the second planetary gear set 26 are continuously connected to a first electrical machine comprising a motor/generator 56, also referred to as "MG-A".

The planetary gear sets 24 and 26 are further compounded in that the carrier 36 of the first planetary gear set 24 is conjoined through a shaft 60 to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through a torque transfer device, or clutch C2 62. The carrier 52 of the third planetary gear set 28 is connected directly to the transmission output member 64.

In the embodiment described herein, wherein the transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 can be either front or rear wheels of the vehicle on which they are employed, or they may be a drive gear of a track vehicle. The drive members 96 may have some form of wheel brake 94 associated therewith.

The inner gear member 40 of the second planetary gear set 26 is connected to the inner gear member 48 of the third planetary gear set 28, through a sleeve shaft 66 that circumscribes shaft 60. The outer gear member 46 of the third planetary gear set 28 is selectively connected to ground, represented by the transmission housing 68, through a torque transfer device or clutch C1 70. The sleeve shaft 66 is also continuously connected to a second electrical machine comprising a motor/generator 72, referred to as MG-B.

A torque transfer device or clutch C3 73 selectively connects the sun gear 40 with ground, i.e., with transmission housing 68. A torque transfer device or clutch C4 75 is operative as a lock-up clutch, locking planetary gear sets 24, 26, electrical machines 56, 72 and the input to rotate as a group, by selectively connecting the sun gear 40 with the carrier 44. The torque transfer devices C2 62, C1 70, C3 73, and C4 75 are all preferably hydraulically actuated friction clutches.

The transmission 10 receives input motive torque from the torque-generative devices, including the engine 14 and the electrical machines 56 and 72, as a result of energy conversion from fuel or electrical potential stored in an electrical energy storage device (ESD) 74.

The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first electrical machine 56 by transfer conductors 29, and the TPIM 19 similarly communicates with the second electrical machine 72 by transfer conductors 31. Electrical current is transferable to or from the ESD 74 in accordance with whether the ESD 74 is being charged or discharged. TPIM 19 includes the pair of power inverters and respective motor control modules configured to receive motor control commands and control inverter states therefrom for providing motor drive or regeneration functionality.

In motoring control, the respective inverter receives current from the DC lines and provides AC current to the respective electrical machine, i.e. MG-A and MG-B, over transfer conductors 29 and 31. In regeneration control, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, MG-A 56 and MG-B 72 are three-phase AC machines and the inverters comprise complementary three-phase power electronics.

Referring now to FIG. 2, a schematic block diagram of the control system, comprising distributed control module architecture, is shown. The elements described hereinafter comprise a subset of overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MG-A and MG-B 56, 72. The distributed control module architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned control modules. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned control modules communicates with other control modules, sensors, and actuators via a local area network ('LAN') bus 6. The LAN bus 6 allows for structured communication of control parameters and commands between the various control modules.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an engine torque command, clutch torque commands for the various clutches C1, C2, C3, C4 of the transmission 10; and motor torque commands for MG-A and MG-B, respectively. The HCP determines when to start and stop the internal combustion engine 14, based upon operating conditions, battery conditions, and user demands for torque input through the UI 13.

The ECM 23 is operably connected to the engine 14, and functions to acquire data from a variety of sensors and control a variety of actuators, respectively, of the engine 14 over a plurality of discrete lines collectively shown as aggregate line 35. For simplicity, ECM 23 is shown generally having bi-directional interface with engine 14 via aggregate line 35. Various other parameters that are sensed by ECM 23 include engine coolant temperature, engine input speed, $N_I$, to shaft 12 leading to the transmission, manifold pressure, ambient air temperature, and ambient pressure. Various actuators that are controlled by the ECM 23 include fuel injectors, ignition modules, and throttle control modules. Engine operation by the ECM 23 includes capability to stop and start engine operation during ongoing vehicle operation. The ECM 23 preferably receives commands to start and stop the engine from the HCP 5.

The TCM 17 is operably connected to the transmission 10 and functions to acquire data from a variety of sensors and provide command signals to the transmission. Outputs from the HCP 5 to the TCM include commands for actuation or deactivation of each of the clutches C1, C2, C3, and, C4 and rotational speed, $N_O$, of the output shaft 64. The TCM is operable to monitor various pressure sensing devices (not shown) in the hydraulic circuit of the transmission, and generate and execute control signals for controlling various pressure control solenoids and flow management valves of the hydraulic circuit.

The BPCM 21 is signally connected one or more sensors operable to monitor electrical current or voltage parameters of the ESD 74 to provide information about the state of the batteries to the HCP 5. Such information includes battery state-of-charge, battery voltage and available battery power.

The Transmission Power Inverter Module (TPIM) 19 includes a pair of power inverters and motor control modules configured to receive motor control commands and control inverter states therefrom to provide motor drive or regeneration functionality. The TPIM 19 is operable to generate torque commands for MG-A 56 and MG-B 72 based upon input from the HCP 5, which is driven by operator input through UI 13 and system operating parameters. The motor torque commands for MG-A and MG-B are implemented by the control system, including the TPIM 19, to control MG-A and MG-B. Individual motor speed signals for MG-A and MG-B respectively, are derived by the TPIM 19 from the motor phase information or conventional rotation sensors. The TPIM 19 determines and communicates motor speeds to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged. The TPIM 19 determines and communicates operating temperatures of MG-A and MB-B to the HCP 5, preferably using on-board temperature sensors (not shown). The TPIM 19 is operatively coupled to a control device for an auxiliary oil pump 110, referred to as TAOP 130.

Each of the aforementioned control modules is preferably a general-purpose digital computer generally comprising a microprocessor or central processing unit, storage mediums comprising read only memory (ROM), random access memory (RAM), electrically programmable read only memory (EPROM), a high speed clock, analog to digital (A/D) and digital to analog (D/A) circuitry, and input/output circuitry and devices (I/O) and appropriate signal conditioning and buffer circuitry. Each control module has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the control modules are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP control module 5 and one or more of the other control modules determine required transmission output torque at shaft 64. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electromechanical transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio (GR1) | C1 70 | C4 75 |
| Fixed Ratio (GR2) | C1 70 | C2 62 |
| Mode II | C2 62 | |
| Fixed Ratio (GR3) | C2 62 | C4 75 |
| Fixed Ratio (GR4) | C2 62 | C3 73 |

The various transmission operating modes described in the table indicate which of the specific clutches C1, C2, C3, C4 are engaged or actuated for each of the operating modes. Additionally, in various transmission operating modes, MG-A and MG-B may each operate as electrical motors to generate motive torque, or as a generator to generate electrical energy. A first continuously variable mode, or gear train, is selected when the torque transfer device 70 is actuated in order to "ground" the outer gear member 46 of the third planetary gear set 28. A second continuously variable mode, or gear train, is selected when the clutch C1 70 is released and the clutch C2 62 is simultaneously actuated to connect the shaft 60 to the carrier 52 of the third planetary gear set 28. Other factors outside the scope of the invention affect when MG-A and MG-B 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel the vehicle from a stationary condition to highway speeds, and meet various other requirements as previously described. Additionally, the control system coordinates operation of the transmission 10 so as to allow synchronized shifts between the modes.

Referring now to FIGS. 3-7, operation of the exemplary powertrain and control system is now described, including a method and system for controlling the main hydraulic pump 88 and the auxiliary hydraulic pump each pump operative to supply hydraulic fluid to the hydraulic circuit of the transmission. The method includes determining a main pressure in the hydraulic circuit and determining a desired main pressure in the hydraulic circuit. Operation of the auxiliary hydraulic pump is controlled based upon the main pressure, the desired main pressure, and an input to the main pump. This is now described in detail.

Figure 3:
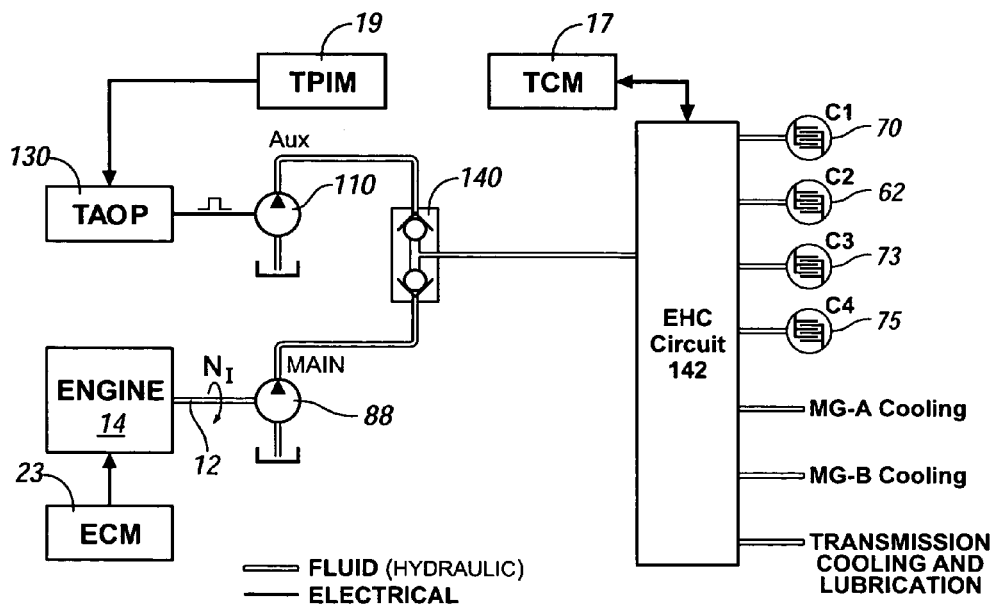
FIG. 3 is a schematic diagram of an aspect of the exemplary control architecture and powertrain, in accordance with the present invention.

Referring now to FIG. 3, a schematic diagram is shown which provides a more detailed description of the exemplary system for controlling flow of hydraulic fluid in the exemplary transmission, including operation of main hydraulic pump 88 and the auxiliary hydraulic pump 110. As previously described with reference to FIG. 1, the main hydraulic pump 88 is driven by gears 82 and 84 that are operatively driven off the input shaft from the engine 10. The main hydraulic pump 88 receives input torque from the engine and pumps hydraulic fluid drawn from a sump into a hydraulic circuit of the transmission, initially passing through control valve 140. The auxiliary pump 110 is operatively controlled by TAOP 130, which is operatively controlled by the TPIM 19. The auxiliary pump 110 preferably comprises an electrically-powered pump of an appropriate size and capacity to provide sufficient flow of pressurized hydraulic fluid into the hydraulic system when operational. The TPIM preferably generates a pulse-width-modulated signal of fixed frequency and a duty cycle which varies from a low value to high value, depending upon the desired output from the pump. The pump 110 receives the signal and pumps hydraulic fluid drawn from the sump into the hydraulic circuit which flows to control valve 140, 140'.

The control valve comprises either of a first embodiment 140, referred to as an exclusive-or ('XOR') scheme, and a second embodiment 140', referred to as a blended scheme. In the first, XOR embodiment, the control valve 140 is mechanized to control flow of hydraulic fluid from the auxiliary pump and the main pump by permitting flow of pressurized fluid into the hydraulic circuit of the transmission substantially exclusively from either the auxiliary pump or the main pump, depending upon operating conditions of pressure and flow from each of the pumps. In the second, blended embodiment, the control valve 140' is mechanized to blend flow of pressurized fluid into the hydraulic circuit of the transmission from both the auxiliary pump and the main pump, preferably when pressure and flow from the pumps are of levels sufficient to overcome valves and springs internal to the control valve 140'. Specific design details of a flow control valve and selection of an embodiment for the flow control valve fall outside the scope of this invention. The exclusive-or ('XOR') scheme is preferably utilized with a powertrain system executed in a rear-wheel drive vehicle. The blended scheme is preferably utilized with a powertrain system executed in a front-wheel drive vehicle.

Regardless of the embodiment of control valve used, pressurized hydraulic fluid flows into the hydraulic circuit 142 of the transmission, distributable to a series of devices, including clutches C1 70, C2 62, C3 73, and C4 75, cooling circuits for machines MG-A and MG-B, and a circuit for cooling and lubricating the transmission 10. Flow of hydraulic fluid to each of the aforementioned devices and circuits is effected through selective actuation of pressure control solenoids and flow management valves contained within the hydraulic circuit 142, controlled by the TCM 17.

Figure 4:
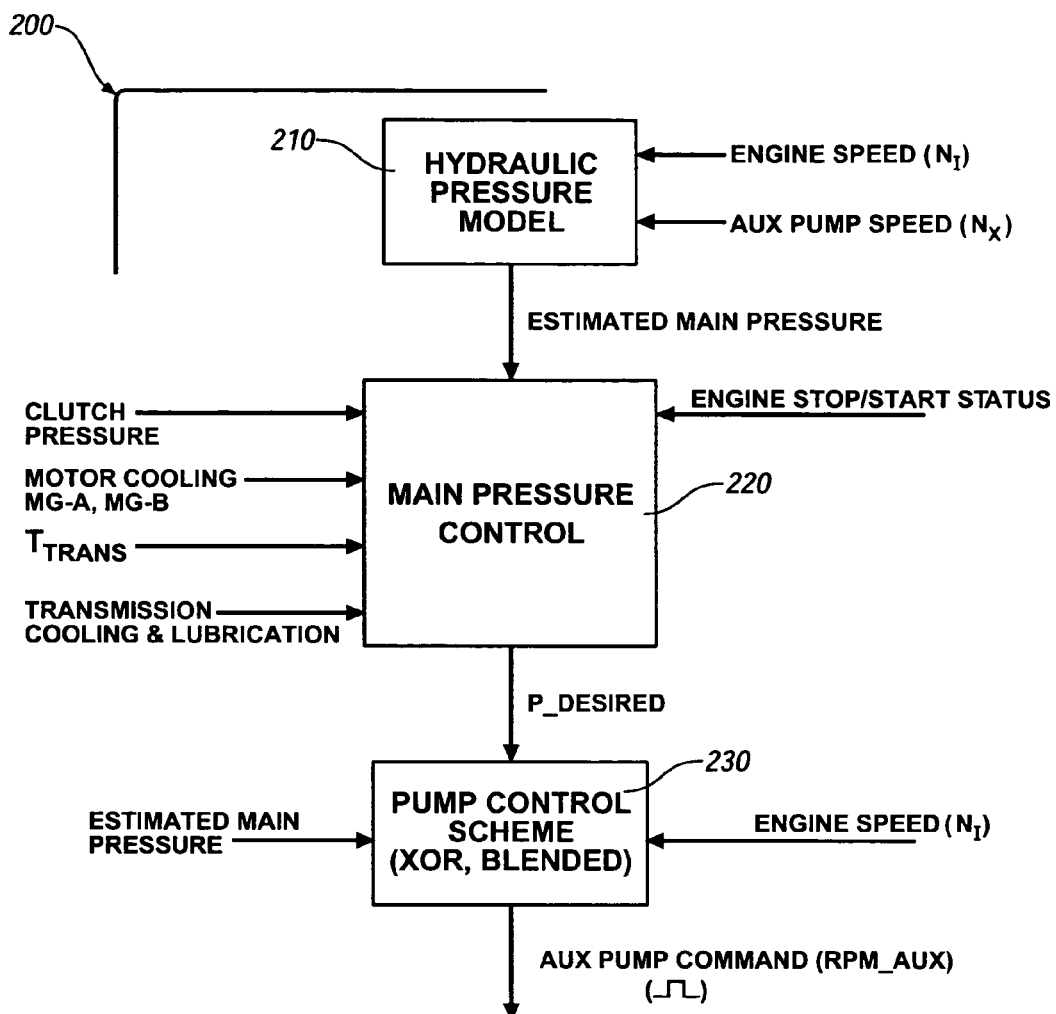
FIG. 4 is an algorithmic flowchart, in accordance with the present invention; and, FIGS. 5, 6, and 7 are data graphs, in accordance with the present invention.

Referring now to FIG. 4, a control scheme 200 is shown for controlling the command to the auxiliary pump 110, preferably executed in the TPIM as one or more algorithms with preset calibration values. In the control scheme, parameters for engine speed, $N_I$, and auxiliary pump speed, Nx, are input to a hydraulic pressure model (Block 210). The hydraulic pressure model comprises a known mathematical model executed for the specific hydraulic system to determine an estimated parameter value for main hydraulic pressure in the hydraulic system of the transmission. Alternatively, hydraulic pressure can be directly measured using a known pressure sensor. The main hydraulic pressure, either estimated or measured directly, is input into main pressure control scheme (Block 220). Other inputs to the main pressure control scheme include: engine stop/start status, indicating whether the internal combustion engine is operating or shutdown; desired clutch pressure, which is driven by clutch torque capacity and selective commands for actuation of the transmission clutches, i.e. C1, C2, C3, and C4; command for cooling of machines MG-A and MG-B 56 and 72, which is preferably driven by measured operating temperatures thereof; temperature of transmission hydraulic fluid; and, an need for cooling and lubrication of the transmission. The intent of the main pressure control scheme (Block 220) is to generate a parametric value for desired main pressure, i.e. P_desired. A skilled practitioner is able to generate a scheme executed as an algorithm to calculate a parametric value for desired main pressure based upon the specific transmission application and the specific operating characteristics encountered. The desired main pressure is used as an input into a pump control scheme (Block 230).

The pump control scheme uses as inputs the engine speed, $N_I$, the desired main pressure, P_desired, and the estimated main pressure, P_main_pump, to calculate a command for operation of the auxiliary hydraulic pump, based upon the embodiment of control valve 140 utilized, i.e. the XOR valve 140 or the blended valve 140', the operation of which is described hereinabove.

Figure 5:
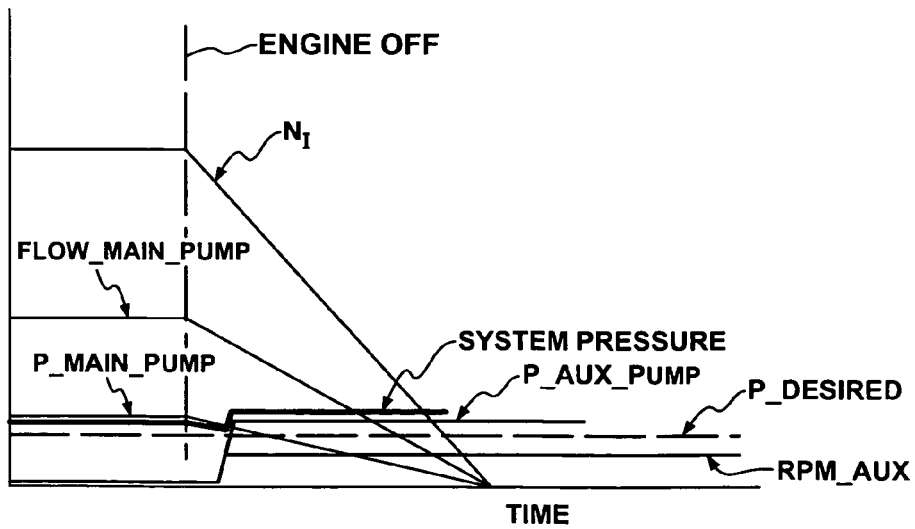
Figure 6:
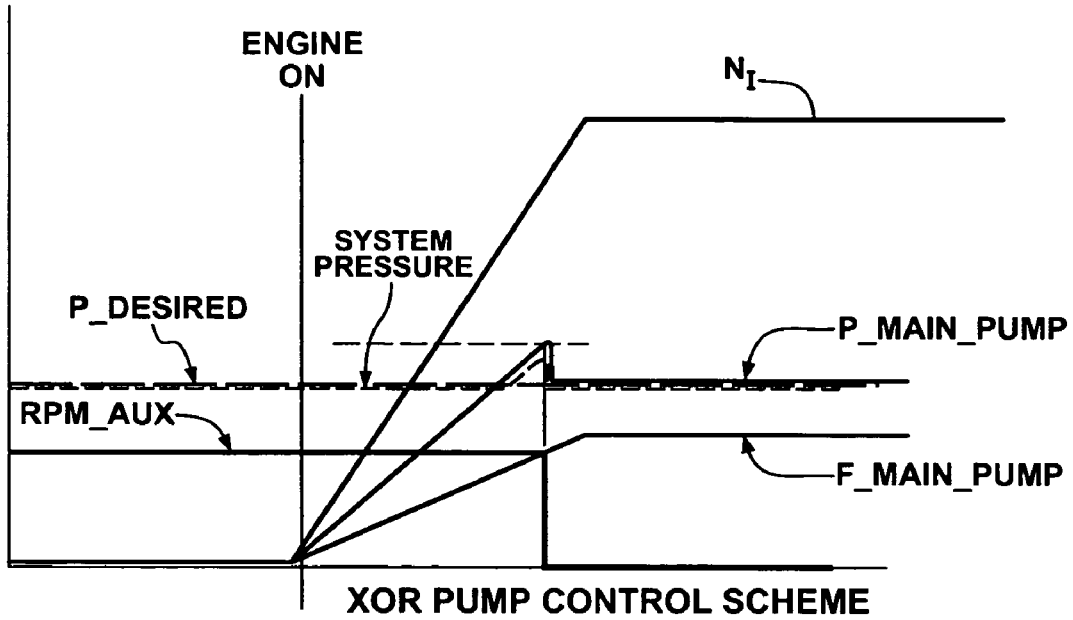
Figure 7:
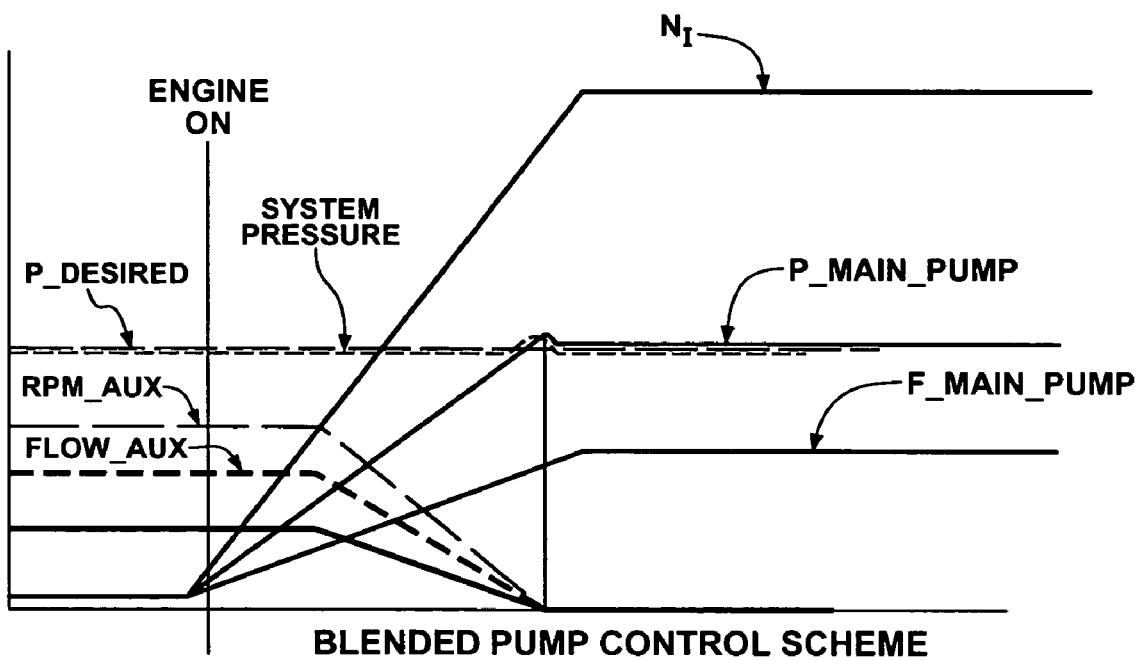

Referring now to the graphs of FIGS. 5, 6, and 7, operation of the exemplary system described with reference to FIGS. 1, 2, and 3 is detailed, wherein the control scheme of FIG. 4 is executed. Referring to the graph of FIG. 5, the exemplary system described with reference to operation when engine input speed, $N_I$, decreases while desired pressure, P_desired, is maintained at a constant value, such as when the engine 14 is turned off while the vehicle continues to operate, e.g. in an engine stop-start situation. This operation is described with reference to a system using the XOR pump control valve 140. When the engine 14 is shutoff, flow from the main pump, Flow_main_pump and main pressure, P_main_pump each decrease. When the main pressure falls below a level, preferably an amount greater than the desired pressure plus a predetermined offset pressure, the TPIM commands the TAOP 130 to operate the auxiliary pump 110 to an operating speed sufficient to attain the desired pressure, P_desired. When pressure from the auxiliary pump 110 is greater than pressure from the main pump, the XOR control valve 140 shifts flows such that pressurized fluid is provided to the hydraulic circuit 142 of the transmission from the auxiliary pump from that point forward while the engine is off. The specifically commanded operating speed from the auxiliary pump 110 is dependent upon specific speed/pressure/flow characteristics of the pump, preferably calibrated into the TPIM Referring to the graph of FIG. 6, the exemplary system described with reference to operation when engine input speed, $N_I$, increases while desired pressure, P_desired, is maintained at a constant value, such as when the engine is turned on while the vehicle continues to operate, again as happens in an engine stop-start situation. This operation is described with reference to a system using the XOR pump control valve 140. When the engine 14 is turned on, flow from the main pump, F_main_pump, increases, as does main pressure, P_main_pump. At the beginning of this graph, a parametric value for the desired pressure, P_desired, has been determined, and the auxiliary pump is running, having been commanded to an operating speed, shown as RPM_AUX. The input speed to the transmission, $N_I$, is zero, indicating the main pump is not running, further evidenced by the flow rate, F_main_pump, being zero, and the main pump pressure, P_main_pump, being zero. At a point in time, the input speed to the transmission, $N_I$, begins to increases, e.g. as a result of turning on the engine. The input speed increases steadily, as do the flow rate, F_main_pump and the main pump pressure, P_main_pump. At a subsequent point in time, the main pump pressure, P_main_pump, meets the desired pressure, P_desired. When the main pump pressure, P_main_pump, exceeds the desired pressure, P_desired, by a predetermined offset value, the main pump is considered able to maintain system pressure, i.e. meet the desired pressure, P_desired. The control signal to the auxiliary pump is then turned off. The action of turning off the auxiliary pump, with corresponding drop in pressure from the auxiliary pump, causes the XOR control valve 140 to shift flow to the main pump.

Referring now to the graph of FIG. 7, operation of the exemplary system described with reference to FIGS. 1, 2, and 3 with the aforementioned blended control valve 140' is described, wherein the control scheme of FIG. 4 is executed. At the beginning of this graph, a parametric value for the desired pressure, P_desired, has been determined, and the auxiliary pump is running, having been commanded to an operating speed, shown as RPM_AUX, with a corresponding flow, Flow_Aux. The input speed to the transmission, $N_I$, is zero, indicating the main pump is not running, further evidenced by the flow rate, F_main_pump, being zero, and the main pump pressure, P_main_pump, being zero. The input speed to the transmission, $N_I$, begins to increases, as before. The input speed increases steadily, as do the flow rate, F_main_pump and the main pump pressure, P_main_pump. At a subsequent point in time, the flow through the blended control valve 140' is made up out of flow from the main pump supplemented by flow from the auxiliary pump. As the flow from the main pump increases due to increased engine speed, $N_I$, the control scheme reduces speed and flow out of the auxiliary pump. When the main pump pressure, P_main_pump, exceeds the desired pressure, P_desired, by the predetermined offset value, the main pump is considered able to maintain system pressure, i.e. meet the desired pressure, P_desired. The auxiliary pump is turned off completely. The main pump delivers all flow of hydraulic fluid from this point forward.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling a powertrain system comprising an engine operatively connected to a transmission, the transmission having a planetary gearset, a hydraulically actuatable torque-transfer clutch, and a hydraulic circuit configured for selectively actuating said torque-transfer clutch, the method comprising:
   mechanically driving a main hydraulic pump when the engine is running to draw hydraulic fluid from a sump and supply the drawn hydraulic fluid to the hydraulic circuit of the transmission;
   selectively electrically driving an auxiliary hydraulic pump to draw hydraulic fluid from the sump and supply the drawn hydraulic fluid to the hydraulic circuit of the transmission;
   determining a main pressure in the hydraulic circuit;
   determining a desired main pressure in the hydraulic circuit; and
   controlling operation of the auxiliary hydraulic pump based upon the main pressure, the desired main pressure, and an input to the main pump.

2. The method of claim 1, wherein determining a main pressure in the hydraulic circuit comprises estimating hydraulic pressure in the hydraulic circuit of the transmission based upon a speed of the engine and a speed of the auxiliary hydraulic pump.

3. The method of claim 1, wherein determining a desired main pressure in the hydraulic circuit comprises:
   determining status of operation of the engine;
   monitoring a temperature of the hydraulic fluid;
   determining a desired pressure for the torque-transfer clutch of the transmission; and,
   generating a parametric value for the desired main pressure based thereon.

4. The method of claim 3, wherein determining the desired main pressure in the hydraulic circuit further comprises monitoring a temperature of an electric machine operatively connected to the transmission.

5. The method of claim 1, wherein controlling operation of the auxiliary hydraulic pump comprises controlling the auxiliary hydraulic pump to an operating speed.

6. The method of claim 1, wherein controlling operation of the auxiliary hydraulic pump based upon the main pressure, the desired main pressure, and an input to the main pump comprises commanding operation of the auxiliary hydraulic pump when the main pressure is less than the desired main pressure plus a predetermined offset.

7. The method of claim 6, wherein controlling operation of the auxiliary hydraulic pump based upon the main pressure, the desired main pressure, and an input to the main pump further comprises discontinuing operation of the auxiliary hydraulic pump when the main pressure is greater than the desired main pressure plus the predetermined offset.

8. The method of claim 1, wherein controlling operation of the auxiliary hydraulic pump based upon the main pressure, the desired main pressure, and an input to the main pump comprises commanding operation of the auxiliary hydraulic pump when the main pressure is less than the desired main pressure plus a predetermined offset.

9. The method of claim 8, wherein controlling operation of the auxiliary hydraulic pump comprises operating the auxiliary hydraulic pump to supplement the supply of hydraulic fluid to the hydraulic circuit of the transmission by the main pump when the main pressure is substantially less than the desired main pressure plus the predetermined offset.

10. Article of manufacture, comprising a storage medium having a computer program encoded therein for controlling a powertrain system comprising an engine operatively connected to a transmission, the transmission having a planetary gearset, a hydraulically actuatable torque-transfer clutch, a hydraulic circuit configured for selectively actuating said torque-transfer clutch, a main hydraulic pump mechanically driven by the engine and an electrically driven auxiliary hydraulic pump, each pump configured to draw hydraulic fluid from a common sump and supply said hydraulic fluid to said hydraulic circuit of the transmission, the computer program comprising:
- code to determine a main pressure in the hydraulic circuit;
- code to determine a desired main pressure in the hydraulic circuit;
- code to control operation of the auxiliary hydraulic pump based upon the main pressure, the desired main pressure, and an input to the main pump.

11. The article of manufacture of claim 10, wherein the code to control operation of the electrically driven auxiliary hydraulic pump based upon the main pressure, the desired main pressure, and an input to the main pump comprises code to command operation of the electrically driven auxiliary hydraulic pump when the main pressure is less than the desired pressure plus a predetermined offset.

12. The article of manufacture of claim 11, wherein code to control operation of the electrically driven auxiliary hydraulic pump based upon the main pressure, the desired main pressure, and an input to the main pump farther comprises code to discontinue operation of the electrically driven auxiliary hydraulic pump when the main pressure is greater than the desired pressure plus the predetermined offset.

13. The article of manufacture of claim 10, wherein code to control operation of the electrically driven auxiliary hydraulic pump based upon the main pressure, the desired main pressure, and an input to the main pump comprises code to command operation of the electrically driven auxiliary hydraulic pump when the main pressure is substantially less than a predetermined level.

14. The article of manufacture of claim 13, wherein code to control operation of the electrically driven auxiliary hydraulic pump comprises code to operate the electrically driven auxiliary hydraulic pump to supplement operation of the main pump when the main pressure is substantially less than the predetermined level.

15. A powertrain system comprising:
- an engine operatively connected to a transmission, the transmission having a planetary gearset, a hydraulically actuatable torque-transfer clutch, and a hydraulic circuit configured for selectively actuating said torque-transfer clutch;
- a main hydraulic pump mechanically driven when the engine is running and configured to draw hydraulic fluid from a sump and supply the drawn hydraulic fluid to the hydraulic circuit of the transmission;
- an auxiliary hydraulic pump selectively electrically driven and configured to draw hydraulic fluid from the sump and supply the drawn hydraulic fluid to the hydraulic circuit of the transmission;
- a controller configured to determine a main pressure in the hydraulic circuit, determine a desired main pressure in the hydraulic circuit, and control operation of the auxiliary hydraulic pump based upon a hydraulic fluid pressure of the hydraulic circuit, a desired hydraulic fluid pressure of the hydraulic circuit, and an input to the main hydraulic pump.

* * * * *